US010445110B1

(12) United States Patent
Judd et al.

(10) Patent No.: US 10,445,110 B1
(45) Date of Patent: Oct. 15, 2019

(54) MODULAR SPACE VEHICLE BOARDS, CONTROL SOFTWARE, REPROGRAMMING, AND FAILURE RECOVERY

(71) Applicant: Triad National Security, LLC, Los Alamos, NM (US)

(72) Inventors: Stephen Judd, Los Alamos, NM (US); Nicholas Dallmann, Los Alamos, NM (US); Kevin McCabe, Santa Fe, NM (US); Jerry Delapp, Los Alamos, NM (US); Dean Prichard, Los Alamos, NM (US); Michael Proicou, Los Alamos, NM (US); Daniel Seitz, Los Alamos, NM (US); Paul Stein, Los Alamos, NM (US); John Michel, Santa Fe, NM (US); Justin Tripp, Los Alamos, NM (US); Joseph Palmer, Los Alamos, NM (US); Steven Storms, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 209 days.

(21) Appl. No.: 15/440,836

(22) Filed: Feb. 23, 2017

Related U.S. Application Data

(63) Continuation of application No. 14/745,941, filed on Jun. 22, 2015, now Pat. No. 9,760,382.
(Continued)

(51) Int. Cl.
*G06F 11/14* (2006.01)
*G06F 9/445* (2018.01)
*G06F 11/07* (2006.01)

(52) U.S. Cl.
CPC ...... *G06F 9/44505* (2013.01); *G06F 11/0739* (2013.01); *G06F 11/0757* (2013.01); *G06F 11/1417* (2013.01); *G06F 11/1433* (2013.01)

(58) Field of Classification Search
CPC ............ G06F 11/0709; G06F 11/0793; G06F 11/0739; G06F 11/0757; G06F 11/1438;
(Continued)

(56) References Cited

U.S. PATENT DOCUMENTS 5,808,866 A * 9/1998 Porter ................. H05K 7/1424
174/377
6,052,753 A * 4/2000 Doerenberg ............ G01S 13/91
710/305

(Continued)

OTHER PUBLICATIONS

ESTCube-1 Wikipedia Page, https://en.wikipedia.org/wiki/ESTCube-1 (last accessed Apr. 24, 2014).
(Continued)

*Primary Examiner* — Nadeem Iqbal
(74) *Attorney, Agent, or Firm* — LeonardPatel PC; Michael Aristo Leonard, II; Sheetal Suresh Patel

(57) ABSTRACT

A space vehicle may have a modular board configuration that commonly uses some or all components and a common operating system for at least some of the boards. Each modular board may have its own dedicated processing, and processing loads may be distributed. The space vehicle may be reprogrammable, and may be launched without code that enables all functionality and/or components. Code errors may be detected and the space vehicle may be reset to a working code version to prevent system failure.

17 Claims, 8 Drawing Sheets

Related U.S. Application Data

(60) Provisional application No. 62/016,561, filed on Jun. 24, 2014.

(58) Field of Classification Search
CPC ............. G06F 11/1482; G06F 11/0703; G06F 11/0766; G06F 11/0772; G06F 11/2002; G06F 11/2221; G06F 11/25
See application file for complete search history.

(56) References Cited

U.S. PATENT DOCUMENTS

| | | | | |
|---|---|---|---|---|
| 6,144,960 | A | 11/2000 | Okada et al. | |
| 6,168,970 | B1* | 1/2001 | Burns | H01L 21/565 257/E21.504 |
| 6,467,003 | B1* | 10/2002 | Doerenberg | G05D 1/0077 710/117 |
| 6,611,783 | B2* | 8/2003 | Kelly, Jr. | A61B 5/0002 340/573.1 |
| 7,069,368 | B2* | 6/2006 | Thornton | G06F 1/184 710/100 |
| 7,127,370 | B2* | 10/2006 | Kelly, Jr. | A61B 5/0002 702/151 |
| 7,500,422 | B2* | 3/2009 | Mazur | F41H 5/013 109/49.5 |
| 8,887,148 | B1 | 11/2014 | Kiaie et al. | |
| 9,092,453 | B2 | 7/2015 | Tsukamoto et al. | |
| 9,167,722 | B2* | 10/2015 | Nagasawa | H05K 7/20336 |
| 9,367,253 | B2* | 6/2016 | Gough | G06F 11/14 |
| 9,760,382 | B2* | 9/2017 | Judd | G06F 9/44505 |
| 2005/0220127 | A1* | 10/2005 | Cane | G05B 19/0421 370/410 |
| 2008/0098388 | A1 | 4/2008 | Beauregard et al. | |
| 2015/0367965 | A1 | 12/2015 | Judd et al. | |

OTHER PUBLICATIONS

Nadeem Iqbal, "Non-Final Office Action", dated Oct. 13, 2016 for U.S. Appl. No. 14/745,941.

Notice of Allowance issued in U.S. Appl. No. 14/745,941 dated Dec. 27, 2016.

Space Micro MSS-01,02 Medium Sun Sensors Brochure, http://www.spacemicro.com/assets/datasheets/guidance-and-nav/MSS.pdf (May 2, 2014).

* cited by examiner

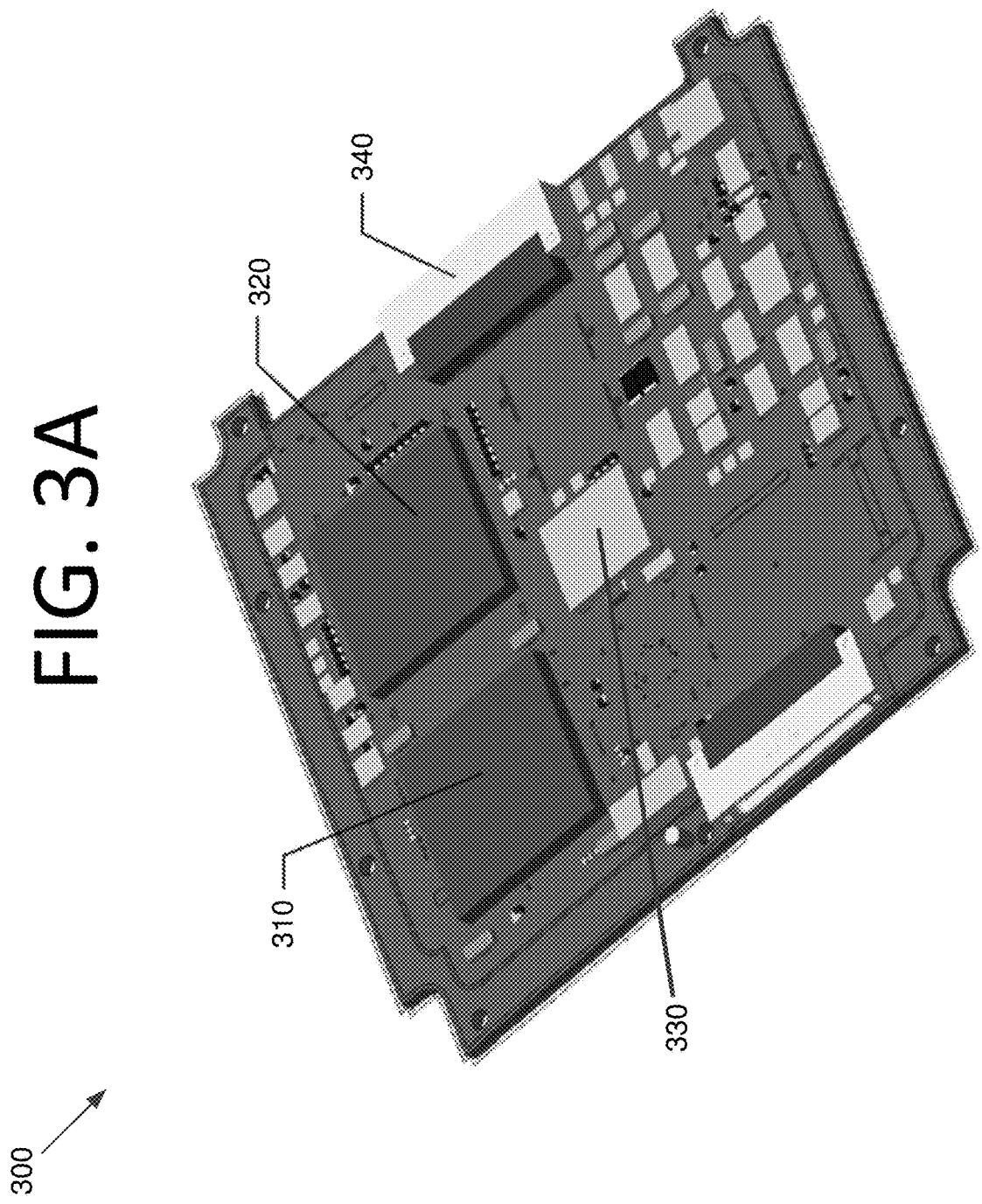

MODULAR SPACE VEHICLE BOARDS, CONTROL SOFTWARE, REPROGRAMMING, AND FAILURE RECOVERY

CROSS REFERENCE TO RELATED APPLICATION

This application is a continuation of, and claims priority to, U.S. nonprovisional patent application Ser. No. 14/745,941 filed on Jun. 22, 2015, which claims the benefit of U.S. provisional patent application No. 62/016,561 filed on Jun. 24, 2014. The subject matter of these earlier filed applications is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to space vehicles, and more particularly, to modular space vehicle boards and software that share common logic and components, and a reprogrammable space vehicle configuration allowing for failure recovery.

BACKGROUND

In conventional space vehicles, subsystems are custom-developed by different providers for various applications pertinent to a given satellite mission. These subsystems, such as the radio, attitude determination and control system (ADCS), and command and data handling (C&DH), have different components, different software, and different interfaces, increasing cost and development time, and reducing interoperability. Furthermore, conventional space vehicles cannot readily be reprogrammed while in operation, and reprogramming on-orbit creates the risk of losing the space vehicle. Accordingly, an improved system design, including circuit board design and software, may be beneficial.

SUMMARY

Certain embodiments of the present invention may provide solutions to the problems and needs in the art that have not yet been fully identified, appreciated, or solved by conventional space vehicle circuit boards and software. For example, some embodiments pertain to a modular space vehicle board system that commonly uses some or all components and a common operating system. In some embodiments, each modular board may have its own dedicated processing. Processing loads may be distributed in some embodiments. In certain embodiments, the space vehicle may be reprogrammable, and may be launched without code that enables all functionality and/or components. In some embodiments, code errors may be detected and the space vehicle may be reset to a working code version to prevent system failure.

In an embodiment, a computer-implemented method includes uploading a new code file, via a microprocessor of a space vehicle, to a local flash drive in a different file than an at-launch code file. The computer-implemented method also includes storing a location of the new code file, by the microprocessor, in a register of a flash-based field programmable gate array (FPGA). The computer-implemented method further includes reading the register and loading the file code, by the microprocessor, into a static random access memory (SRAM)-based FPGA.

In another embodiment, a computer program is embodied on a non-transitory computer-readable medium. The program is configured to cause a microprocessor to store one or more uploaded code files in a flash bank of a space vehicle. The computer program is also configured to cause the microprocessor to store a different, current flash bank to use in a register of a flash-based field programmable gate array (FPGA) of the space vehicle. The computer program is further configured to cause the microprocessor to read the register of the flash-based FPGA, jump to the current flash bank to use, and run the one or more uploaded code files via a boot loader.

In yet another embodiment, a space vehicle includes memory storing computer program code and at least one microcontroller configured to execute the stored computer program code. The at least one microcontroller is configured to check whether a short watchdog interrupt has been received. When the short watchdog interrupt has been received, the at least one microcontroller is configured to check whether a first error is detected. When the first error is detected, the at least one microcontroller is configured to check whether a number of resets has reached a maximum number of resets. When the maximum number of resets has been reached, the at least one microcontroller is configured to reset the space vehicle to an at-launch code state. When the maximum number of resets has not been reached, the at least one microcontroller is configured to reset the space vehicle to a most recently uploaded code state. The at least one microcontroller is also configured to check whether a long watchdog interrupt has been received. When the long watchdog interrupt has been received, the at least one microcontroller is configured to check whether a second error is detected. When the second error is detected, the at least one microcontroller is configured to reset the space vehicle to an at-launch code state.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3A is a perspective view illustrating a common board used for digital radio, ADCS, and C&DH, according to an embodiment of the present invention.

DETAILED DESCRIPTION OF THE EMBODIMENTS

Some embodiments of the present invention pertain to a modular space vehicle board system that commonly uses some or all components and a common operating system. Each modular board may have its own dedicated processing. Processing loads may be distributed. The space vehicle may be reprogrammable, and may be launched without code that enables all functionality and/or components. Code errors may be detected and the space vehicle may be reset to a working code version to prevent system failure.

Figure 1:
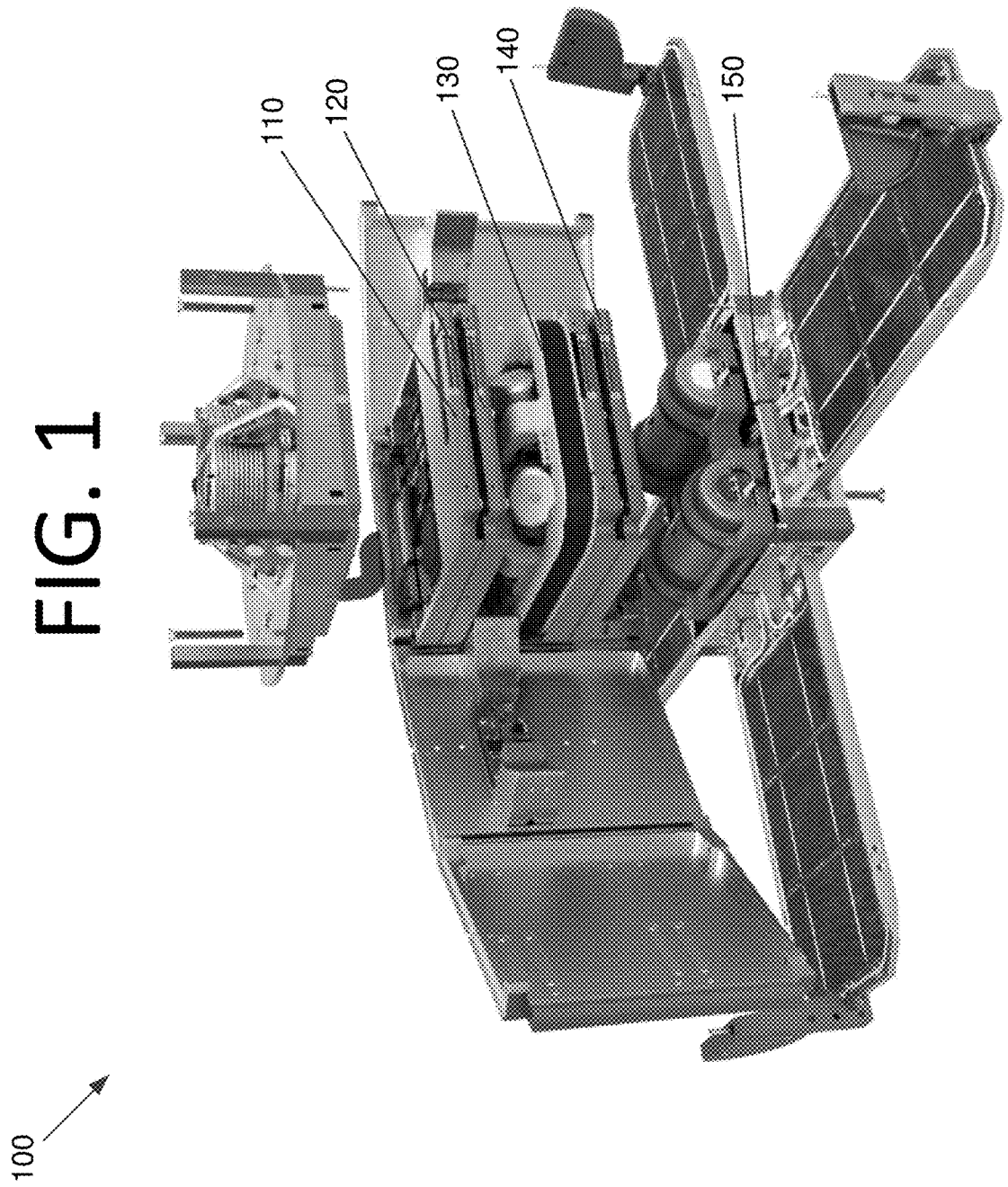
FIG. 1 is an exploded perspective view illustrating a cubesat with an opened chassis, according to an embodiment of the present invention.

FIG. 1 is an exploded perspective view illustrating a cubesat 100 with an opened chassis, according to an embodiment of the present invention. Cubesat 100 includes a high band digital radio 110, a low band digital radio 120, an ADCS module 130, a C&DH module 140, and a power module 150. In some embodiments, the various boards of space vehicles, such as cubesat 100, may have some or all components in common and may use a common software architecture and stack.

Card Frame

Figure 2:
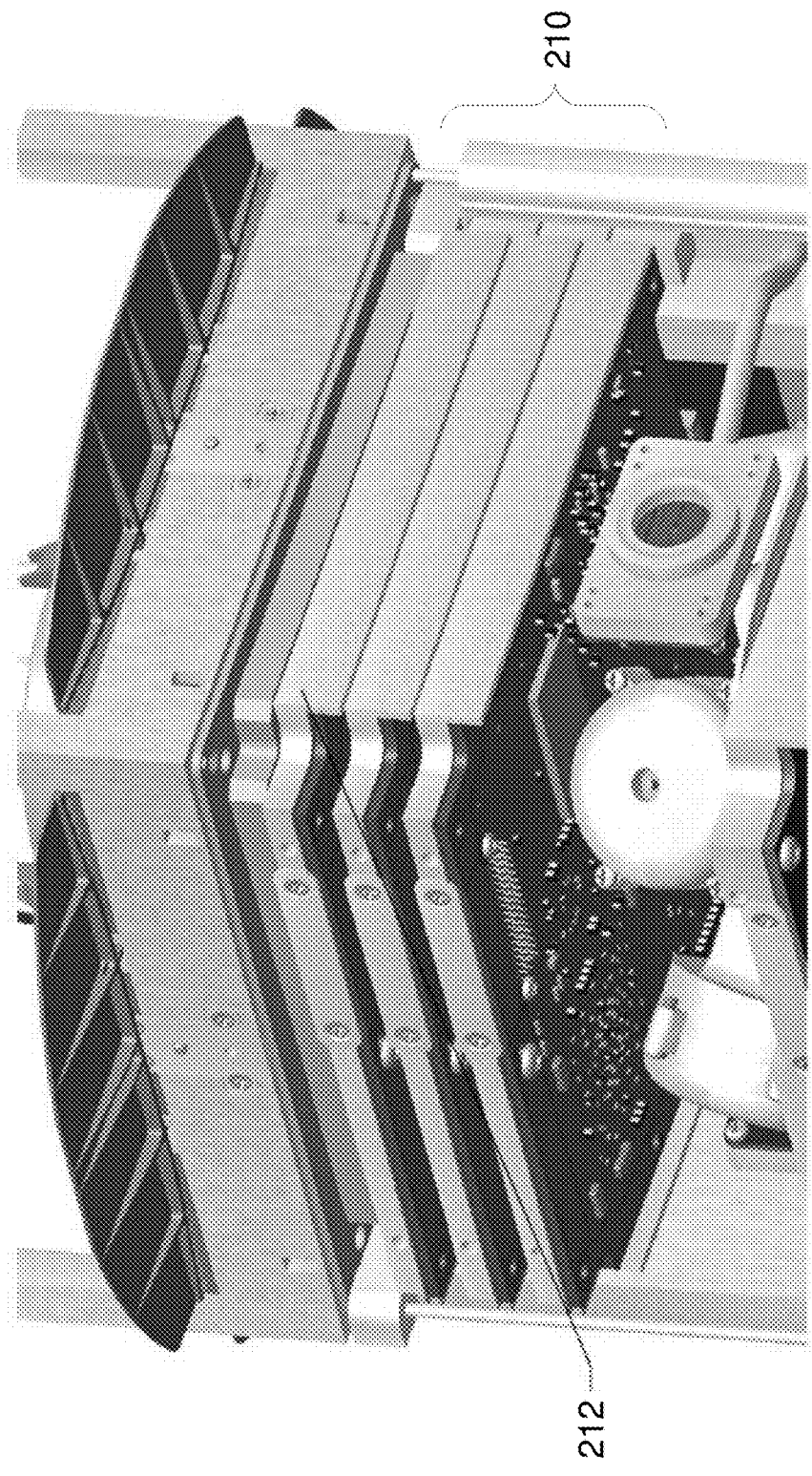
FIG. 2 is a perspective view illustrating a space vehicle with an exposed card frame, according to an embodiment of the present invention.

FIG. 2 is a perspective view illustrating a space vehicle 200 with an exposed card frame 210, according to an embodiment of the present invention. Card frame 210 provides a solid structure to mount boards, such as printed circuit boards (PCBs). Edges 212 mitigate against or prevent damage to neighboring boards during assembly. Card frame 212 can also provide good thermal conductivity to the body of cubesat 200 or provide thermal isolation, depending on thermal analysis results. Card frames are not used for conventional cubesats.

Modular Boards Sharing Common Components and Software

Some embodiments use modular boards that share at least some common components. Generally speaking, common hardware allows for common software, as well as reusability of board designs for multiple space vehicles. This common hardware and software may make the boards modular and may lead to significant cost savings.

For conventional space vehicles, such as satellites, one company makes radios, another makes the ADCS, another makes flight computers, etc. Due to component reusability, some embodiments allow a single company or other entity to develop multiple or all boards for the space vehicle. Furthermore, in some embodiments, multiple or all boards may be designed and integrated up front by a single company or other entity. The resultant cost savings is attractive for all space vehicles, but is especially beneficial for small, more cost-dependent space vehicles, such as cubesats.

Furthermore, some or all boards may have their own dedicated processing, instead of "dumb" boards that share a single flight computer. Thus, individual boards can carry out their own processing and share data with other boards. Conventional satellites have a central processing unit (i.e., a flight computer) that handles and processes data from peripheral boards. The flight computer is required to run the peripherals. Having board-level processors may also allow processing to be distributed across multiple boards based on respective processing loads. In certain embodiments, some boards, such as C&DH, may be eliminated entirely, with their functionality performed by other individual boards or distributed across multiple boards. For instance, depending on processing load, the digital radio boards, ADCS, and/or power module may perform C&DH operations. Any other board for any desired functionality may be included in this modular configuration as a matter of design choice.

FIG. 3A is a perspective view illustrating a common board 300 used for digital radio, ADCS, and C&DH, according to an embodiment of the present invention. In other words, the digital radio, ADCS, and C&DH boards both use the layout and components of common board 300. In some embodiments, components of a digital radio, ADCS, and C&DH may be mostly the same, with special purpose components used to carry out functionality that is specific to the given board. For example, if the C&DH does not require an FPGA, the FPGA may not be populated on the board. If the ADCS board requires an extra input from a sun sensor, for example, an additional connector may be added without changing the overall board layout and components. However, in some embodiments, components used for only radio or C&DH functionality, for example, are included on a common board in order to reduce overall cost. Furthermore, in some embodiments, the ADCS and/or power module share some or all components in common with the digital radio and C&DH. With this architecture, the same board may be used for any enabled functionality, and by using multiple boards having the same architecture in this manner, redundancy is provided to the system. Furthermore, processing operations can be performed by any single board (e.g., the board with the lowest processing workload) or distributed between multiple boards.

Figure 3B:
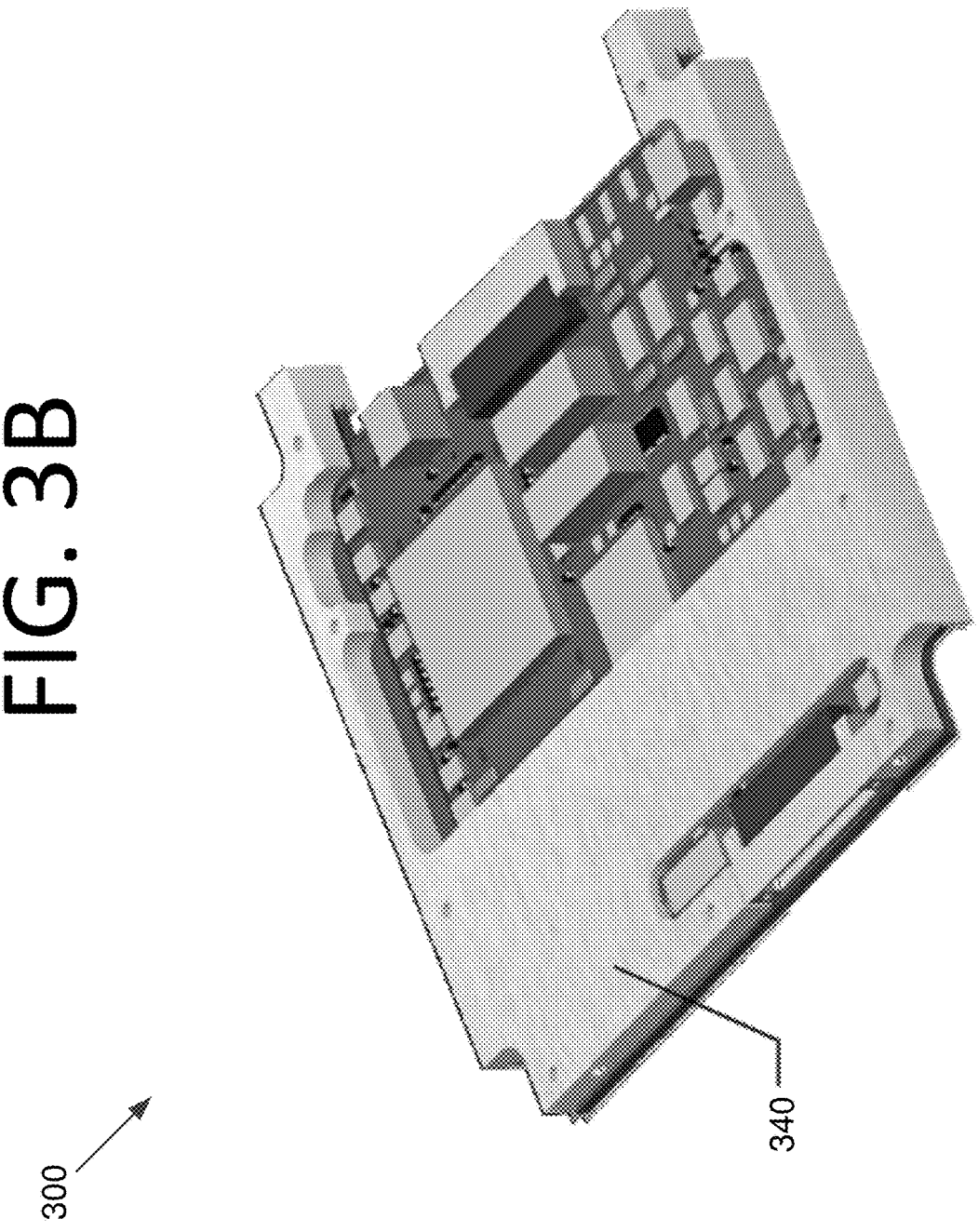
FIG. 3B is a perspective view illustrating the board of FIG. 3A in a card frame, according to an embodiment of the present invention.

In the embodiment of FIGS. 3A and 3B, common board 300 includes a first static random access memory (SRAM)-based field programmable gate array (FPGA) 310 that may perform digital signal processing. For example, in the digital radio, first FPGA 310 may provide software defined radio (SDR) functionality. A card frame 340 provides a thermal path for first FPGA 310 in this embodiment. See FIG. 3B. A second FPGA 320, such as a flash-based FPGA, may provide supervisory and signal routing functionality. A microprocessor 330 may provide general processing and hardware interfacing capabilities. A backplane connector 340 connects common board 300 to a backplane (not shown). For instance, in some embodiments, the digital radio board(s) may connect to an analog radio board via the backplane and backplane connector 340.

Space Vehicle Software

Due to shared components in some embodiments, a common base operating system may be used across multiple boards. Each board may have unique application-level software to implement its functionality. This reduces the number of operating systems that developers must learn and use in order to program at least some of the boards, and provides a common interface for application developers. Only the application level code needs to be written in such embodiments once the operating system is developed. Using a common code base also increases reliability and improves system interoperability.

Figure 4:
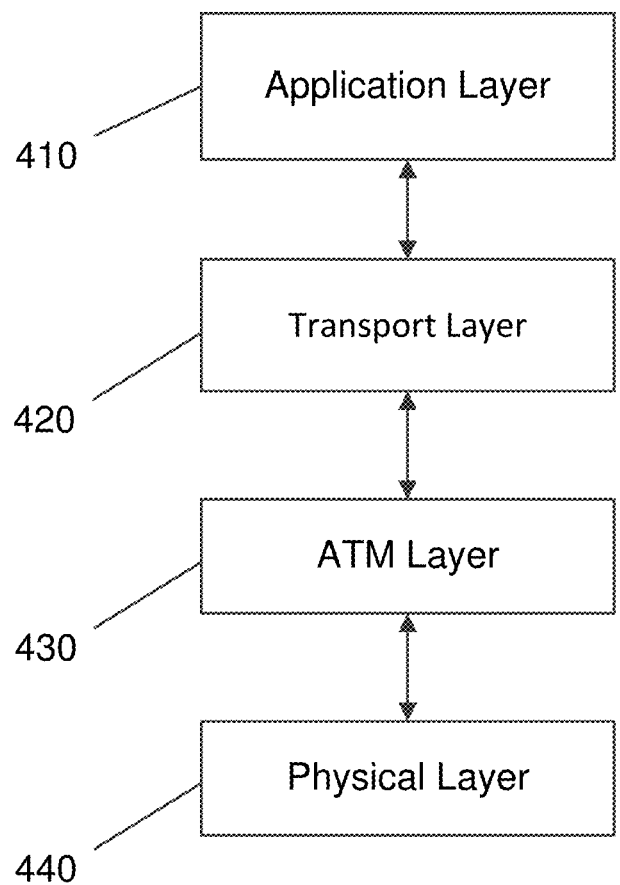
FIG. 4 is a block diagram illustrating software networking layers for a space vehicle, according to an embodiment of the present invention.

FIG. 4 is a block diagram illustrating software layers 400 for a space vehicle, according to an embodiment of the present invention. An application layer 410 contains the main code, including commanding, data acquisition and processing, etc. A transport layer 420 provides for opening and closing of connections, segmentation and reassembly, authentication, and encryption. An asynchronous transfer mode (ATM) layer 430 provides ATM cell routing. A physical layer 440 provides serial peripheral interface (SPI) protocol, universal asynchronous receiver/transmitter (UART) protocol, radio and other hardware drivers, etc. Use of modified ATM on space vehicles is novel in and of itself.

The modified ATM protocol connects nodes via a virtual circuit. Nodes can be boards, satellites, field units, etc. Different "circuits" can be used for commands, data, encryption, etc. Use of ATM may make software more simple and efficient. The cell header overhead is tiny in some embodiments, with a two byte circuit ID. Such a cell structure is shown in the pseudocode below.

```
struct {
    union {
        struct {
            bool Eof:1
            bool Eot:1
            bool Parity:1
        }
        struct {
            uint8_t ctl:3
            uint16_t vci:8
            uint8_t vpi:5
        }
        struct {
            uint8_t pad0:3
            bool command:1
            bool outbound:1
            uint16_t avci:6
            uint8_t pad1:5
        }
        raw_circuit_t header
    }
    uint8_t data [AtmDataLen]
};
```

This cell includes a 2 byte header and 32 bytes of data. An 8 bit virtual channel identifier (vci), a 5 bit virtual path identifier (vpi), and control (ctl) make up the header. Three bits for end of file (Eof), end of transmission (Eot), and header parity (Parity) are included in the data. The remaining fields are specific implementation bits to determine whether a circuit is a command or data channel and is outbound or inbound traffic, based on the VCI/VPI circuit number.

In contrast to traditional ATM, 32 bytes of data is used in some embodiments as a compromise for commands versus data, encryption, overhead/throughput, and for simplified software development. In addition, a simpler 2-byte header is used to further improve efficiency, compared to a 5-byte header for traditional ATM. However, any desired cell size may be used.

Space Vehicle Reprogramming and Recovery

In conventional space vehicles, the entire space vehicle design, including software, must be implemented before the space vehicle is launched into orbit or beyond. This increases development time, reduces flexibility, and potentially increases cost. However, space vehicles of some embodiments may be reprogrammed after only the core system software is implemented. The core software required at launch may include the ability to turn on and deploy space vehicle deployables (e.g., antennas, solar panels, etc.), the ability to communicate with the ground, and the ability to reprogram the space vehicle. Software development for other components and/or functionality can continue after launch. This allows for more rapid deployment, as well as code experimentation and code updates after launch.

In conventional space vehicles, reprogramming or updating space vehicle code when the vehicle has already been deployed is a significant hurdle. Conventional satellite systems, for example, tend to cost on the order of hundreds of millions to billions of dollars and have custom components with their own unique software architectures. Typically, it takes at least two years just to get approval to upload new satellite code, and there is always a chance that bad code will get past review. If bad code is uploaded, the satellite may be lost, potentially wasting hundreds of millions or billions of dollars.

Some embodiments overcome this problem using a unique configuration of hardware and software. On the hardware side, a pair of FPGAs may be used, such as the configuration shown in FIG. 3A. The first FPGA may be a SRAM-based device where the FPGA code is loaded by a microprocessor on power-up and after reset. The microcontroller may be a separate chip that is not embedded in the FPGA in some embodiments. The FPGA code may be stored on a local flash drive at launch in a protected (read-only) file.

Figure 5:
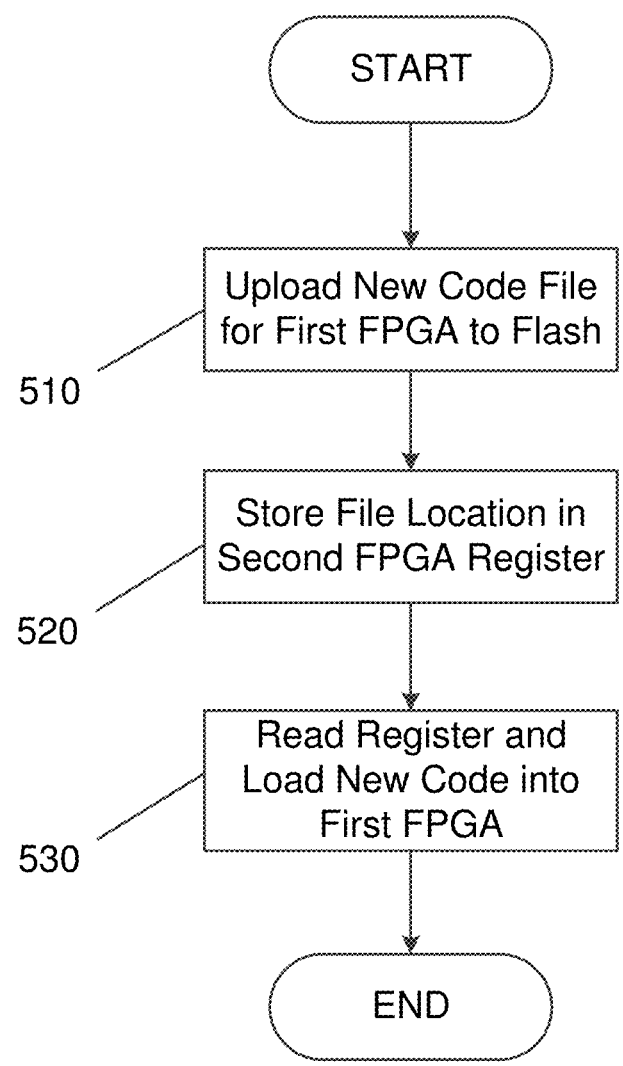
FIG. 5 is a flowchart illustrating a process for reprogramming an FPGA of a space vehicle, according to an embodiment of the present invention.

FIG. 5 is a flowchart 500 illustrating a process for reprogramming an FPGA of a space vehicle, according to an embodiment of the present invention. To reprogram the first FPGA, for example, the new code may be uploaded to the local flash drive in a different file than the "at launch" code at 510. The location of the file to use may then be stored in a register of the second FPGA at 520. The microprocessor then reads the register and loads the file code into the first FPGA at 530.

The microprocessor (or microcontroller) may store code in internal flash, and has multiple banks of flash. The microprocessor can write to the internal banks of flash. "At launch" code is protected in one flash bank and is not changed.

Figure 6:
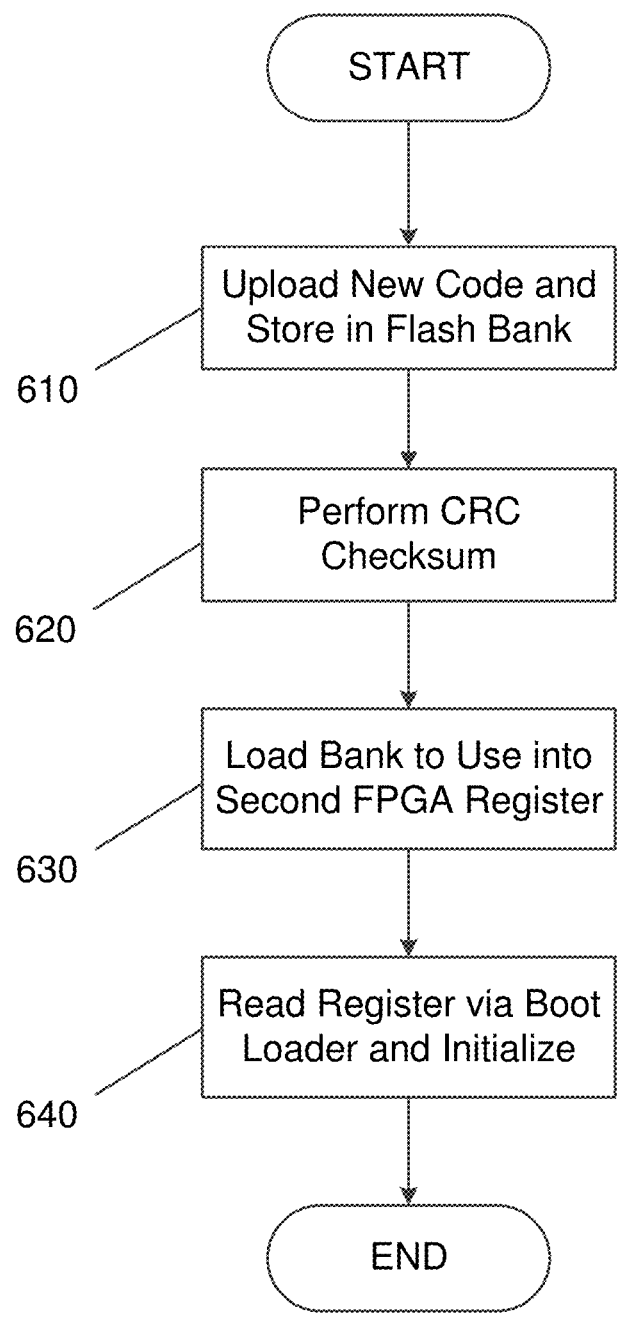
FIG. 6 is a flowchart illustrating a process for reprogramming a microprocessor of a space vehicle, according to an embodiment of the present invention.

FIG. 6 is a flowchart 600 illustrating a process for reprogramming a microprocessor of a space vehicle, according to an embodiment of the present invention. To reprogram the microprocessor, uploaded code is stored in another flash bank at 610. To ensure file integrity, a cyclic redundancy check (CRC) checksum is applied to uploaded files at 620 before attempting to execute the uploaded code. The current bank to use is then stored in a register of the second FPGA at 630. A boot loader is then used to read the register of the second FPGA, jump to that flash bank, and run the new microprocessor code at 640.

Per the above, if uploaded code has a problem, the satellite may be lost. Some embodiments avoid this problem by using two watchdogs in a highly reliable FPGA that acts as a supervisor circuit for the microcontroller. A "short" watchdog may be used to detect processor code execution errors, such as processor lockup, infinite loops, and the like, and to reset the processor when such events occur. For instance, an interrupt may trigger every ten milliseconds for the short watchdog, but any desired time period may be used. Initially, the watchdog may reset the code to the most recently uploaded state. If a predetermined number of watchdog resets occur, the system may then revert to the at-launch (safe) software. A second "long" watchdog may be used to detect loss of contact with a ground station, and to reset the satellite to its at-launch (safe) software. For instance, an interrupt may trigger every 24 hours for the long watchdog, but any desired time period longer than the short watchdog may be used. A "watchdog" is special digital logic in the FPGA that can restore the system to its previous working state. In some embodiments, the satellite is restored to the most recently uploaded software. In certain embodiments, the satellite is reset to its at-launch (safe) software when more serious errors are detected.

Figure 7:
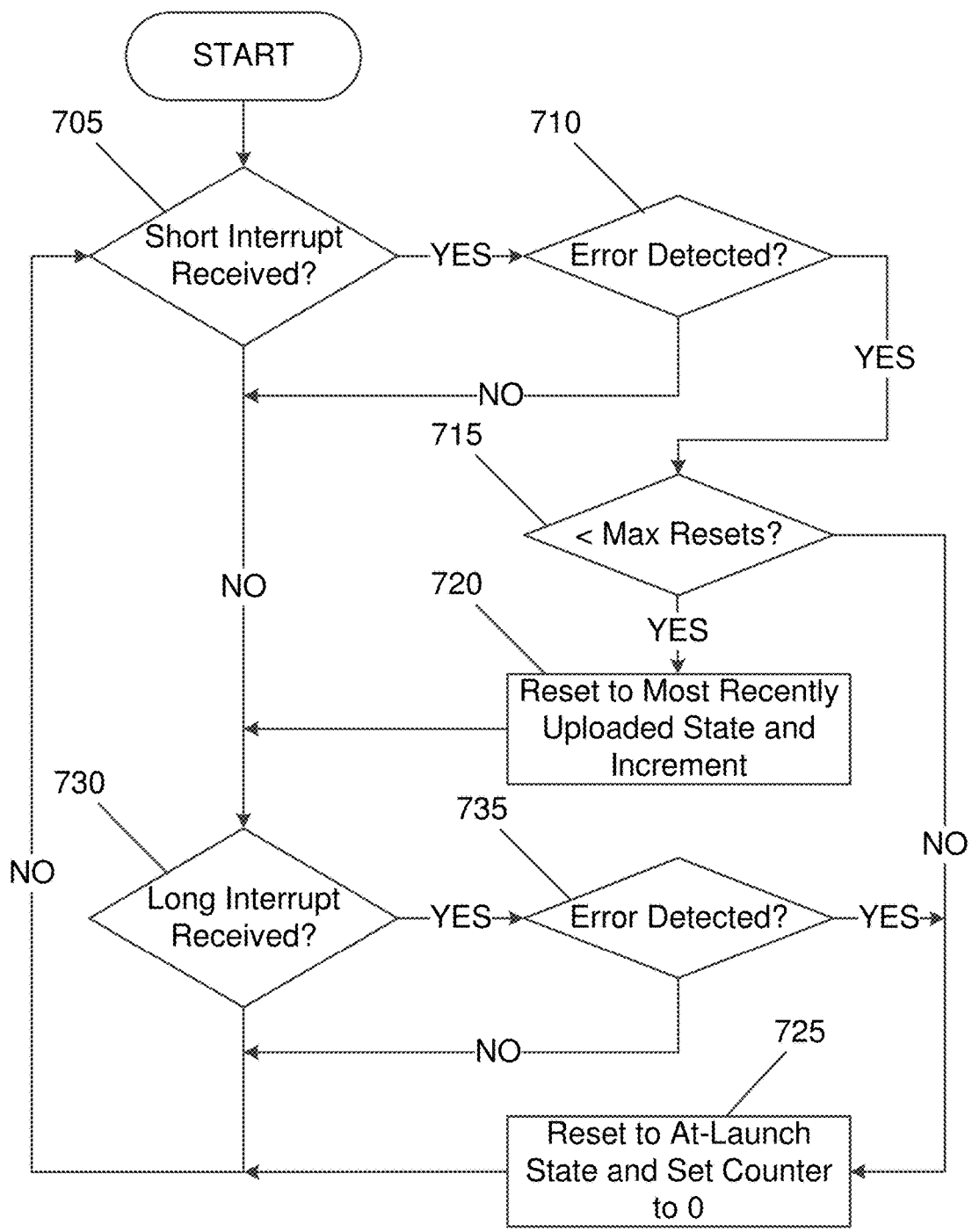
FIG. 7 is a flowchart illustrating a process for identifying code problems and resetting a space vehicle, according to an embodiment of the present invention.

FIG. 7 is a flowchart 700 illustrating a process for identifying code problems and resetting a space vehicle, according to an embodiment of the present invention. The process begins with checking whether a short interrupt has been received at 705. If not received, the process continues to step 730. However, if the interrupt is received at 705, the space vehicle checks whether an error is detected at 715, e.g., processor lockup, infinite loops, etc. If an error is detected at 710, the space vehicle checks whether the number of resets is less than a maximum number of resets at 715. If yes, the space vehicle resets to the most recently uploaded code state and increments the maximum number of resets at 720. If no, the space vehicle resets to the at-launch code state and sets the counter to zero at 725.

If a long interrupt is received at 730, the space vehicle checks whether an error is detected at 735, e.g., the inability to communicate with a ground station. If no error is detected, the space vehicle continues checking for interrupts. If an error is detected at 735, the space vehicle resets to the at-launch code state and sets the counter to zero at 725. While interrupts are used in this embodiment, in some embodiments, timers may be used in addition to or in lieu of the interrupts to track when to check for errors. However, if only a timer is used, the space vehicle may not be able to recover from infinite loops.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A card frame, comprising:
a plurality of edges configured to mitigate against damage to or protect a plurality of modular boards during assembly, wherein
the card frame provides a solid structure to mount the plurality of modular boards,
the card frame provides thermal conductivity to a body of a space vehicle or thermal isolation from the body of the space vehicle to the plurality of modular boards, and
the card frame is part of the space vehicle.

2. The card frame of claim 1, wherein the plurality of modular boards are mounted in the card frame.

3. The card frame of claim 2, wherein each modular board has its own dedicated processing.

4. The card frame of claim 2, wherein the plurality of modular boards use a common operating system.

5. The card frame of claim 2, wherein the plurality of modular boards share at least some common components with one another.

6. The card frame of claim 2, wherein the plurality of modular boards are configured to distribute a processing load.

7. The card frame of claim 2, wherein the plurality of modular boards are reprogrammable and are deployed without code that enables at least some functionality of the plurality of modular boards.

8. The card frame of claim 2, wherein one or more of the plurality of modular boards is configured to detect code errors and reset one or more boards of the plurality of modular boards to a working code version when a code error is detected.

9. The space vehicle of claim 2, wherein the plurality of modular boards use a common stack.

10. The space vehicle of claim 2, wherein each of the plurality of modular boards comprises:
a first static random access memory (SRAM)-based field programmable gate array (FPGA) configured to perform digital signal processing;
a second FPGA configured to provide supervisory and signal routing functionality;
a microprocessor configured to provide general processing and hardware interfacing capabilities; and
a backplane connector configured to connect the respective board to a backplane, wherein
the card frame provides a thermal path for the first FPGA.

11. The space vehicle of claim 1, further comprising:
a modular board configured to provide digital radio, an attitude determination and control system (ADCS), and command and data handling (C&DH).

12. The space vehicle of claim 1, further comprising:
a modular board configured to provide digital radio;
a modular board configured to provide an attitude determination and control system (ADCS); and
a modular board configured to provide command and data handling (C&DH), wherein
components of each board are the same, except for special purpose components configured to provide specific radio, ADCS, and C&DH functionality, respectively, providing redundancy.

13. An apparatus, comprising:
a plurality of modular boards; and
a card frame configured to provide a solid structure to mount the plurality of modular boards, wherein
each of the plurality of modular boards comprises:
  a first static random access memory (SRAM)-based field programmable gate array (FPGA) configured to perform digital signal processing;
  a second FPGA configured to provide supervisory and signal routing functionality; and
  a microprocessor configured to provide general processing and hardware interfacing capabilities, and
the card frame is configured to provide thermal conductivity to a body of a space vehicle or thermal isolation from the body of the space vehicle to the plurality of modular boards mounted within the card frame.

14. The apparatus of claim 13, wherein each of the plurality of modular boards further comprises a backplane connector that connects the respective board to a backplane.

15. The apparatus of claim 13, wherein at least one of the plurality of modular boards is configured to provide digital radio, an attitude determination and control system (ADCS), and command and data handling (C&DH).

16. A modular board, comprising:
a first static random access memory (SRAM)-based field programmable gate array (FPGA) configured to perform digital signal processing;
a second FPGA configured to provide supervisory and signal routing functionality; and
a microprocessor configured to provide general processing and hardware interfacing capabilities, wherein
the modular board is configured to provide digital radio, an attitude determination and control system (ADCS), and command and data handling (C&DH).

17. The modular board of claim 16, wherein
the modular board is reprogrammable and is deployed without code that enables at least some functionality of the modular board, and
the modular board is configured to detect code errors and reset the modular board to a working code version when a code error is detected.

* * * * *